Inventors
Wilmer J. Altschwager
Marcy F. Aynes
By [signature]
Attorney

United States Patent Office 2,769,105
Patented Oct. 30, 1956

2,769,105

ELECTRIC MOTOR SUITABLE FOR USE IN AN ATMOSPHERE CONTAINING MAGNETIC PARTICLES

Wilmer J. Altschwager and Marcy F. Aynes, Milwaukee, Wis., assignors to The Louis Allis Company, Milwaukee, Wis., a corporation of Wisconsin Application January 26, 1953, Serial No. 333,267

2 Claims. (Cl. 310—88)

This invention relates to dynamoelectric machinery, and refers more particularly to electric motors of the fully enclosed type.

Electric motors used in an atmosphere which is heavily laden with dust are naturally more susceptible to early bearing trouble than motors operating in a clean air, especially where the dust contains an abrasive. For this reason motors intended for installations where they will operate under such conditions are usually of the fully enclosed type, having an imperforate housing from which only the shaft projects, all other working parts of the motor being enclosed within the housing.

However, even in such totally enclosed motors some dust inevitably is drawn into the motor interior through the running clearance between the shaft and the edge of the hole through which it projects by the "breathing" of the motor in consequence of its normal heating and cooling due to starting, stopping, change of load, change of current consumption and the like. To provide a seal capable of actually preventing the passage of dust through this slight clearance would be prohibitively expensive as well as mechanically impracticable since the particle size of the dust is often measured in microns, and in many cases is finer than talcum or other fine powders.

Any dust which enters the motor and thus reaches the bearings creates a serious problem, but an especially troublesome situation has heretofore been encountered in electric motors used in certain mining machinery installations, as for example those used in iron mining operations, where the abrasive character of the dust is further aggravated by the fact that it is comprised of a substantial percentage of magnetic particles. Such dust not only caused bearing failures but also, in extreme cases, winding burn-outs.

It is obvious that a motor which can satisfactorily cope with the problems encountered in such mining machinery installations will have a wide range of utility in other industries as for instance foundries, metal grinding rooms and similar factory applications where the air is heavily laden with dust particles.

With this in mind it is an object of this invention to provide an electric motor of the totally enclosed type wherein the "breathing" which takes place in consequence of changes in the operating temperature of the motor will not result in the deposit of dust particles in the motor bearings or in the interior of the motor housing.

Another object of this invention resides in the provision of a fully enclosed motor of the character described having means permitting the motor to "breathe" clean air freely into its housing interior so that "breathing" of the motor will not cause dust-laden air to be drawn through the shaft apertures in the motor housing.

Still another object of this invention resides in the provision of a totally enclosed type of electric motor which will have a breather in its housing provided with means for intercepting particles of finely divided magnetic material, to thus prevent the entry of such material into the interior of the housing where it would otherwise be attracted by the magnetic elements of the motor mechanism and where it would cause bearing failures and burnouts.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which.

Figure 1:
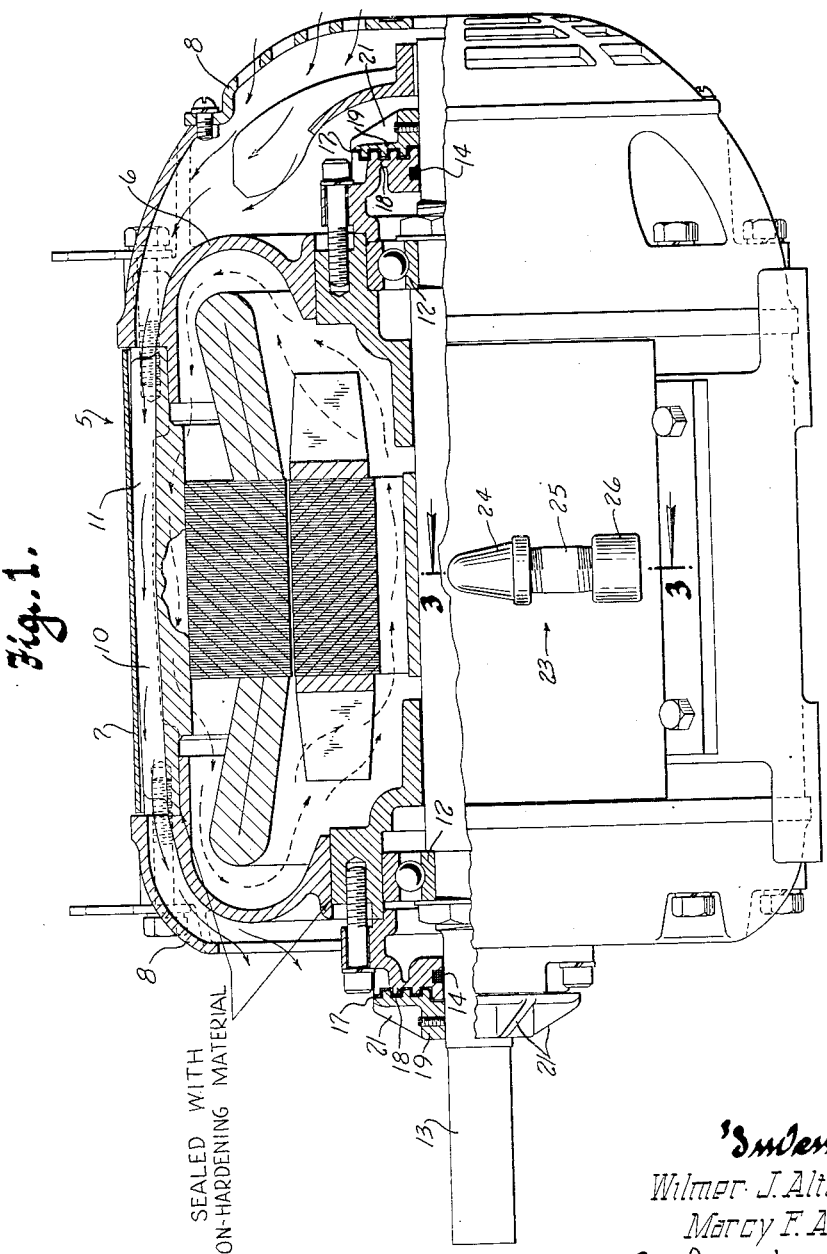
Figure 1 is a view partially in side elevation and partially in longitudinal section of a motor embodying the principles of this invention.
Figure 2:
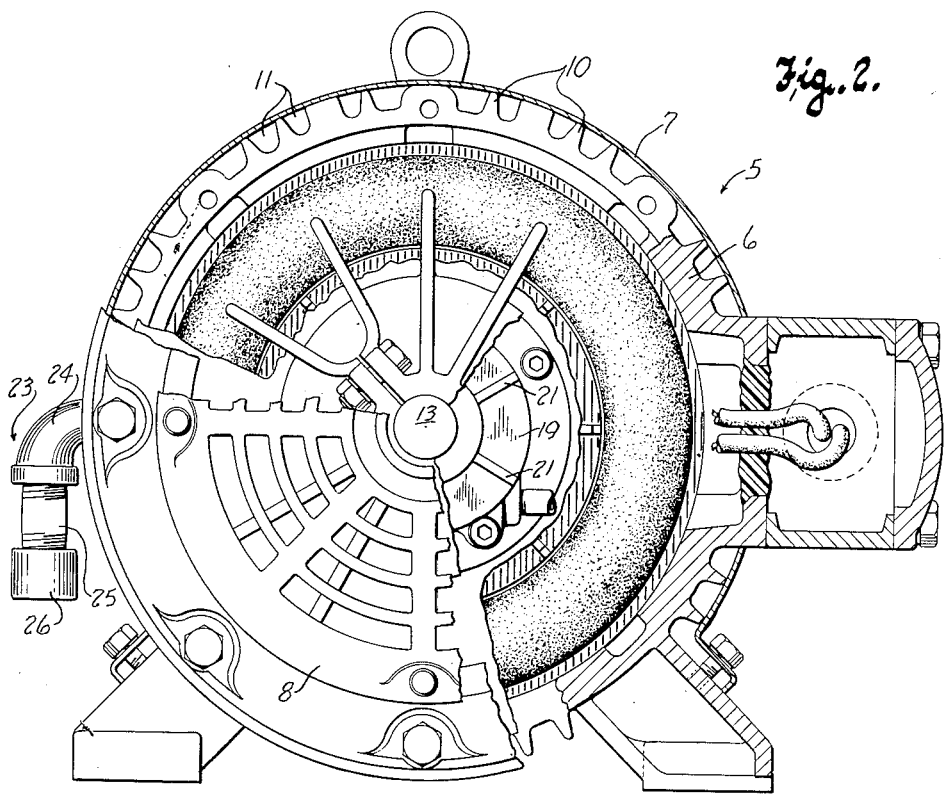
Figure 2 is an end view of the motor with portions thereof broken away and shown in section.

Referring now more particularly to the accompanying drawings, in which like numerals designate like parts throughout the several views, the numeral 5 designates generally the housing of an electric motor of the fully enclosed type, comprising an inner imperforate shell 6 and an outer shell 7. The end bell portions 8 of the outer shell are apertured to permit cooling air to flow freely across the inner shell, the latter being formed with numerous longitudinal ribs 10 extending along the medial portion which cooperate with the outer shell to define a plurality of longitudinal passages 11 for such air.

As is conventional, the bearings 12 in which the rotor shaft 13 is journaled are seated in bearing mounts in the end bells. A packing 14 around the shaft, axially outwardly of each of the bearings and sealing the shaft apertures in the end bells, to some extent prevents particles of foreign matter from reaching the bearings, but it has been found that reliance cannot be placed upon these seals alone to preclude the entry of the finer particles of destructive material to the bearings. An additional measure of protection is afforded by conventional labyrinth seals 17 at the entrances to the shaft apertures, the labyrinthine configuration being provided by the portion 18 of the end wall of the end bell which immediately surrounds the shaft and a cooperating flange 19 fixed to the shaft.

Still further protection against the entry of dust particles into the bearings is afforded by impeller vanes 21 which, when the shaft is rotating, agitate the adjacent air and impel it radially outwardly, away from the entrance of the adjacent labyrinthine passage.

Collectively, the packing 14, the labyrinth seals 17 and the impellers 21 provide excellent assurance against the ingress of particulated foreign matter into the motor through the running clearance between the motor shaft and the apertures in the housing walls through which the shaft passes, but despite the effectiveness of these seals they cannot prevent the entry of air to the interior of the motor housing as a result of the inevitable "breathing" of the motor caused by temperature changes inside the motor, nor can they prevent the finer dust particles from entering the housing and particularly the motor bearings along with such air.

Figure 3:
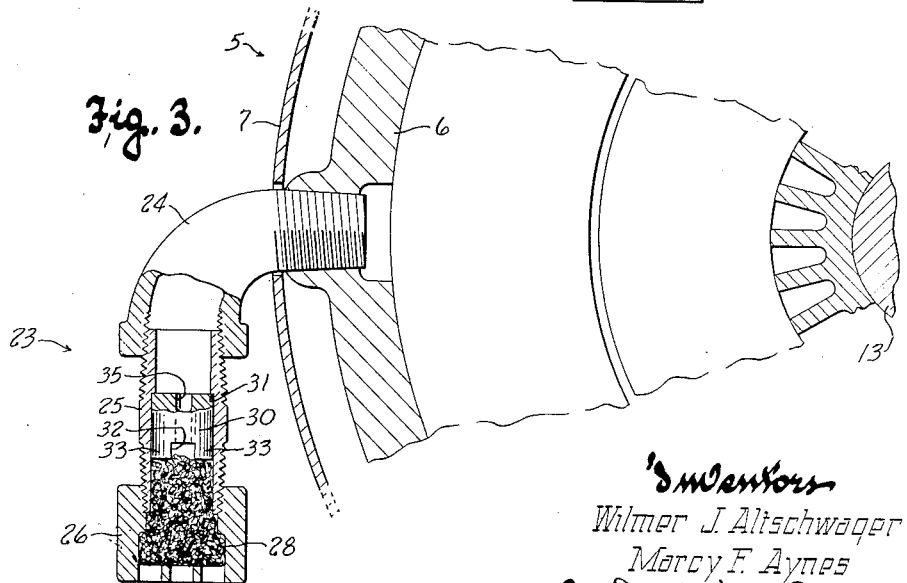
Figure 3 is an enlarged sectional view of a portion of the motor, showing the breather in relation to the motor housing.

Means are, therefore, provided to satisfy this "breathing" of the motor in a manner which assures the entry of only clean air to the housing interior and eliminates the possibility of dust-laden air being sucked into the motor through the clearance between the shaft and the edge of the hole or holes through which it projects. To this end a breather, designated generally by the numeral 23, is provided to communicate the interior of the motor housing with the atmosphere in such a manner that upon the occurrence of negative pressure within the motor the breather accommodates the entire resulting influx of air but effectively excludes dust from the housing interior. This breather, as best seen in Figure 3, may be readily fashioned from ordinary threaded pipe elements, such as an elbow 24 threaded into the inner shell of the housing, a nipple 25 connected with the elbow, and a cap 26 threaded onto the nipple. It will, of course, be understood that the outer shell is suitably apertured to enable the elbow to be secured in the inner housing wall.

The cap is apertured to admit air to the breather, and directly under the cap and extending a substantial distance into the nipple is a packing 28 of fine steel wool, brass wool, or similar foraminous material, for intercepting particles of foreign matter in the air stream entering the breather. A screen of relatively fine mesh, preferably of non-magnetic material, may also be provided between the mouth of the breather and the packing if desired.

An annular permanent magnet 30, of Alnico or the like, seats on an outwardly facing shoulder 31 in the nipple, said shoulder being defined by an enlargement of the bore of the nipple in its axially outer portion, and the annular magnet and packing are thus clamped between the cap and the shoulder 31. A diametral slot 32 in the magnet, across its axially outer end, defines a pair of pole pieces 33 across which a relatively powerful magnetic field exists at all times. Hence, microscopic particles of magnetic material which pass the packing filter will be attracted to one of the magnet pole pieces and will settle thereon, while clean air will flow unimpeded to the housing interior through the bore 35 in the magnet.

It will be understood that the cap 26 may be readily unscrewed from the nipple to facilitate cleaning or replacement of the packing 28 and cleaning of the annular magnet 30.

To insure that all of the air passing to the housing interior will enter by way of the breather and thus be compelled to traverse the filters 28 and 30 therein, it is of course, essential that the breather 23 provides an air passage of considerably less resistance to air flow than the labyrinthine passages at the shaft apertures and that all of the joints between component parts of the inner housing member are calked with a non-hardening sealing material such as white lead.

From the foregoing description taken together with the accompanying drawings, it will be readily apparent that this invention provides an electric motor of the fully enclosed type wherein the "breathing" of the motor, consequent to changes in its temperature, will not cause particles of foreign matter to be introduced into the motor bearings and housing interior, and that by virtue of this characteristic the motor of this invention is particularly adapted to installations, such as mining machinery, where it will be exposed to a duct-laden atmosphere.

What we claim as our invention is:

1. An electric motor for use in an atmosphere heavily laden with fine magnetic dust particles, said motor being of the totally enclosed type having a housing which is imperforate and sealed except for the necessary running clearance between the motor shaft and the apertures in the housing walls through which the shaft leaves the motor bearing housings and extends to the exterior of the motor, and a breather in a wall of the housing through which the interior of the motor is communicated with the exterior thereof, said motor being characterized by the provision of: means at the shaft apertures of the housing between the motor bearings and the exterior of the motor, sealing said apertures as well as possible against the ingress of dust laden air from the surrounding atmosphere into the motor bearings and the interior of the housing, said means comprising interfitting parts carried by the exterior walls of the motor bearing housings and the adjoining portions of the shaft forming a labyrinth seal; and by the fact that the breather through which the interior of the motor is communicated with the exterior thereof has considerably less resistance to air flow than that offered by the seals at the apertures through which the shaft of the motor leaves its bearing housings so that the breathing of the motor does not induce air flow into the motor bearing housings, the breather containing an air filtering medium therein including permanent magnet means for trapping particulated foreign matter and especially microscopic particles of magnetic dust contained in the surrounding atmosphere without appreciably interfering with the free flow of air through the breather.

2. The electric motor of claim 1 wherein the permanent magnet means of the filtering medium in the breather is an annular permanent magnet so positioned in the breather that all air passing through the breather must pass through the hole in the magnet, and said magnet having pole-forming portions thereon spaced from one another at opposite sides of its hole.

References Cited in the file of this patent

UNITED STATES PATENTS

| | | |
|---|---|---|
| 811,967 | Stillwell | Feb. 6, 1906 |
| 1,342,592 | Orr | June 8, 1920 |
| 1,878,858 | Kitto | Sept. 20, 1932 |
| 2,029,078 | Matney | Jan. 28, 1936 |
| 2,126,383 | Grothe | Aug. 9, 1938 |
| 2,323,146 | Manney | June 29, 1943 |
| 2,458,759 | Abell | Jan. 11, 1949 |
| 2,470,050 | Petterson | May 10, 1949 |
| 2,644,099 | Ludwig | June 30, 1953 |

FOREIGN PATENTS

| | | |
|---|---|---|
| 679,655 | Germany | Aug. 10, 1939 |